March 24, 1970 R. B. WRIGHT 3,503,045

APPARATUS FOR PROVIDING INFORMATION TRANSFER BETWEEN A DATA PROCESSING SYSTEM AND AN EXTERNAL MEDIUM OPERATING AT A DIFFERENT RATE

Filed Feb. 15, 1960

INVENTOR.
R. BYRON WRIGHT

BY

[signature]

ATTORNEY.

United States Patent Office 3,503,045
Patented Mar. 24, 1970

3,503,045

APPARATUS FOR PROVIDING INFORMATION TRANSFER BETWEEN A DATA PROCESSING SYSTEM AND AN EXTERNAL MEDIUM OPERATING AT A DIFFERENT RATE

Robert Byron Wright, Saratoga, Calif., assignor to General Electric Company, a corporation of New York
Filed Feb. 15, 1960, Ser. No. 8,879
Int. Cl. G06f *1/00, 7/00, 15/00*
U.S. Cl. 340—172.5 16 Claims

ABSTRACT OF THE DISCLOSURE

Temporary storage registers are disclosed for receiving data items for transfer in both directions between a magnetic tape unit and a memory. The first register receives the data entities from the tape and, when loaded, transfers the information to the second register and thence to the memory. The first register continues to receive the data entities of the next stored data item from the magnetic tape. The third register receives a complete data item from memory. The information is transferred to a fourth storage register which then transfers the data items by data entities to the tape. The use of separate temporary storage registers for receiving data and sending data allows the simultaneous reading and writing of the magnetic tape to and from memory.

Figure 1:
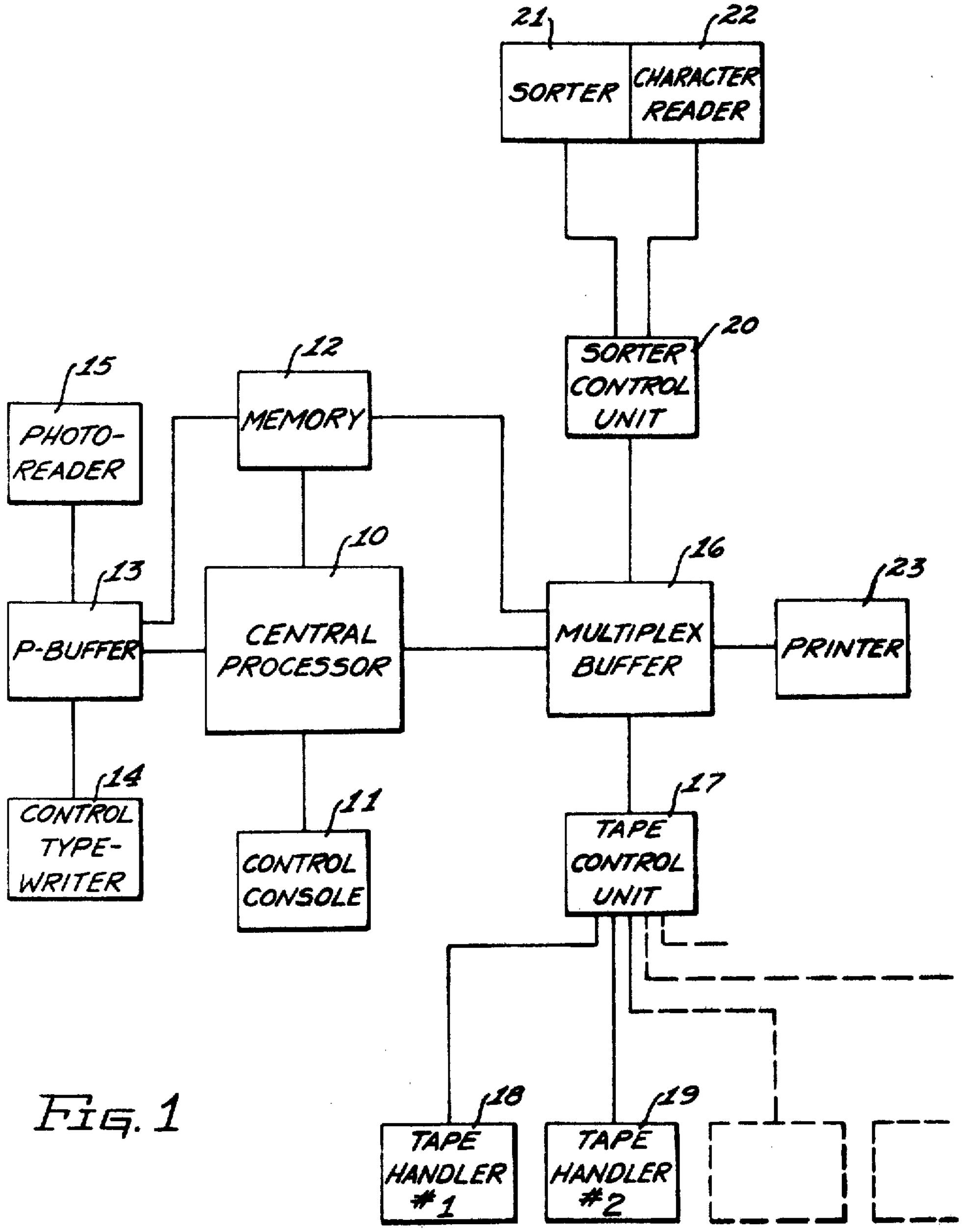

This invention relates to information processing apparatus and more particularly to apparatus for processing data at high speeds and adapted to communicate with slower operating components.

In the processing of data, various arithmetic and logical operations are performed on data items by a data processing unit, which is adapted to execute a sequence of these operations in a very short period of time. To maintain a rapid rate of execution of these operations, the data processing unit must be able to immediately receive data items when needed and to immediately store data items after processing. Rapid receipt and storage of data items by the data processing unit is provided by a high-speed random access memory. The random access memory operates at a rate of speed compatible with that of the data processing unit and rapidly supplies a data item needed by the data processing unit or rapidly stores a data item provided by the data processing unit.

From time to time, the data processing unit will complete the processing of the data items in the memory or will fill the available memory storage space with processed data items, so that means must be provided to supply the memory with new data items for processing or to empty the memory contents into another storage medium. Consequently, additional storage media are provided, such as magnetic tape data storage units. These magnetic tape units communicate with the memory, under control of the data processing unit, to transmit new data items to the memory or to receive processed data items therefrom. However, magnetic tape units transmit and receive data items at a much slower rate than the data processing unit processes data; that is, the time between transmittal or receipt of successive data items by a tape unit is comparable to the time required for the data processing unit to execute several operations. Therefore, it is desirable, in order to maintain a high average data processing speed, that the data processing unit does not remain idle during a period when the magnetic tape unit is filling or unloading the memory. Instead, it is preferable that the data processing unit continue to execute the aforementioned sequence of operations, pausing only when the magnetic tape unit is ready to receive from or transmit to the memory a complete data item.

The magnetic tape unit comprises a longitudinal strip of magnetic tape moving at a uniform speed with respect to reading and recording elements thereof. The magnetic tape has stored thereon, or is adapted to store thereon, in succession the individual data entities of each data item. Therefore, a magnetic tape unit reads the data entities on the magnetic tape and transmits electrical representations thereof at regularly occurring intervals. Conversely, a magnetic tape unit receives electrical representations of data entities and records these entities on the magnetic tape thereof at regularly occurring intervals. Therefore, a first temporary storage means must be provided to accumulate the data entities of a data item as it is read from a tape unit and a second temporary storage means must be provided for holding a data item received from the memory until a tape unit can accept and record all of the data entities thereof.

It is not desirable, however, that the data processing unit be required to pause at the moment the first temporary storage means receives the last entity of a complete data item, or at the moment the second temporary storage means has been emptied by the tape unit. Instead, it is preferable that the data processing unit continue to execute an operation until a convenient time occurs for the data processing unit to pause to receive the data item. During the interval following entry of a complete data item in the first temporary storage means and the time when the data processing unit pauses to transfer this data item to the memory, the magnetic tape unit continues to supply data entities of the next recorded data item. Similarly, during the interval following transfer to the tape unit of the last data entity of the data item in the second temporary storage means and the time when the data processing unit pauses to transmit another data item thereto, additional storage spaces of the magnetic tape pass the recording elements thereof. It is therefore necessary in such a system to provide apparatus to satisfy the problem that the magnetic tape unit must continue to record or to read data entities during such intervals.

Therefore, it is an object of this invention to provide a high-speed data processing unit adapted to communicate with slower operating components.

Another object of this invention is to provide a data processing system adapted to operate with minimum time of interruption for communication with slower operating components.

Another object of this invention is to provide a data processing system adapted to communicate with a slower regularly operating component by pausing only when a complete data item must be transmitted from or received by said component.

Another object of this invention is to provide a data processing system adapted to communicate at irregular periods with a slower regularly operating component.

Another object of this invention is to provide a data processing system adapted to receive a complete data item at irregular periods from a component which supplies the entities of the data item at regular periods.

Another object of this invention is to provide a data processing system adapted to transmit data items at irregular periods to a component which receives the entitites of the data item at regular periods.

A further object of the invention is to provide data transfer apparatus which employs a minimum number of components to enable a high speed data processing unit to communicate with slower operating components.

Another object of this invention is to provide, in a system wherein a data transfer member function as a communication link between a high speed data processing unit and slower operating components, apparatus for detecting a failure of either the data processing unit or the slower operating components to effect a timely transfer of data to or from the data transfer member.

Another object of this invention is to provide, in a data processing system adapted to receive data items from a component which supplies the entities of the data items at regular periods, apparatus for detecting a failure of the component to supply an entity during a predetermined period.

The foregoing objects are achieved by providing a pair of temporary storage registers for receiving data items from a magnetic tape unit for transfer to the memory and by providing an additional pair of temporary storage registers for receiving data items from the memory for transfer to a magnetic tape unit. In the operation wherein data items are transferred from tape to memory, one of the registers continues to receive data entities read from the tape after a complete data item has been inserted in the other register. In the operation wherein data items are transferred from memory to tape, one of the registers is adapted to receive a complete data item from memory before all of the data entities of the preceding data item supplied have been transferred to tape from the other register. First and second temporary storage registers are provided. The second temporary storage register is adapted to store a complete data item while the first temporary storage register is adapted to store a plurality of data entities comprising less than a data item. The data entities read from magnetic tape are transferred in sequence to the first register and from the first register to the second register. When a complete data item has been transferred to the first register, the data entities of the complete data item are shifted into the adjacent second register, thereby freeing storage spaces in the first register. The data processing unit is then notified that a complete data item is available for transfer to the memory. The available free elements of the first storage register then continue to receive data entities of the next stored data item on the magnetic tape during the interval required for the data processing unit to pause to receive the complete data item. Third and fourth temporary storage registers are also provided. The third temporary storage register is adapted to store a complete data item while the fourth temporary storage register is adapted to store a plurality of data entities comprising less than a data item. Data entities are transferred sequentially from the fourth register to a magnetic tape unit for recording. Prior to the time when the fourth register has been emptied, a complete data item is transferred from the memory to the third register. When the fourth register is emptied, data entities in the third register are shifted into said fourth register. After the third register has been emptied it is again free to receive another data item from the memory.

The invention will be described with reference to the accompanying drawings, wherein:

FIGURE 1 is a block diagram of a data processing system to which the instant invention is applicable.

DATA PROCESSING SYSTEM—GENERAL

The Data Processing System of FIG. 1 is adapted to process data under operational control of a Central Processor 10. The lines interconnecting the various components illustrated in FIG. 1 represent symbolically paths of data and control communication.

The Central Processor responds to a plurality of distinct instruction, which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to be processed, data words which are the results of processing, and instruction words. The Central Processor communicates with the Memory to receive therefrom data words on which operations are to be performed and instructions words. Following certain data processing operations, the Central Processor transmits the resulting data words to the Memory for storage.

A P-Buffer 13, controlled by the Central Processor, temporarily stores data words being transferred from a Control Typewriter 14 or a Photoreader 15 to Memory and data words being transferred from Memory to the Control Typewriter. The Control Typewriter receives data words from the P-Buffer and types a visible representation of these words or punches on paper tape an encoded representation of these words. The Control Typewriter also transfers data words to the P-Buffer by reading encoded punched paper tape or upon depression of Control Typewriter keys in proper sequence. The Photoreader photoelectrically reads punched encoded paper tapes and transfers the electrical representations of the data thereon to the P-Buffer.

A Multiplex Buffer 16, indirectly controlled by the Central Processor, temporarily stores data being transferred from magnetic tape or from magnetically imprinted documents to Memory and data being transferred from Memory for recording on magnetic tape or for imprinting in visible representation. A Tape Control Unit 17 directs one of a plurality of Tape Handlers 18, 19 (etc., to read data from the respective magnetic tape thereof and to deliver this data to the Multiplex Buffer. The Tape Control Unit also directs one of the Tape Handlers to write data provided by the Multiplex Buffer on the respective magnetic tape thereof.

A Sorter Control Unit 20 controls the reading of data borne by documents, such as bank checks, and directs the sorting of these documents into pockets of a Sorter 21. A Character Reader 22 senses magnetically imprinted information on these documents and delivers an encoded representation of this data to the Multiplex Buffer. The Central Processor delivers to the Sorter Control Unit data representing the pockets of Sorter 21 in order that the documents handled thereby may be appropriately sorted in accordance with the information thereon.

A Printer 23 receives data words from the Multiplex Buffer and prints a visible representation of these words.

Thus, the system of FIG. 1 processes data received from magnetic tape, documents, the Control Typewriter, or the Photoreader and communicates the results of the data processing by providing a visible record, by permanently storing the results on magnetic tape, by punching paper tape, or by sorting documents.

For a complete description of the system of FIGURE 1 and of the instant invention which is embodied in such system, reference is made to U.S. Patent 3,077,984 issued to R. R. Johnson and assigned to the assignee of the present invention. More particularly, FIGURES 2–245 of the drawings; column 1, lines 8–73; column 2; column 3, lines 1–27; column 4, lines 55–75; columns 5 and 6; column 7, lines 1–16; column 8, lines 8–75; columns 9–258; and column 259, lines 1–35 of U.S. Patent 3,077,984 are incorporated herein by reference and made a part of the instant patent application.

Certain portions of the apparatus herein disclosed are not of my invention, but are the inventions of:

J. G. Levinthal and N. R. Crain, as defined by the claims of their application, Ser. No. 46,162, filed July 29, 1960, W. G. Facenda, Jr., and David Zeheb, as defined by the claims of their application, Ser. No. 46,164, filed July 29, 1960, B. F. Burch, Jr., and C. H. Tucker, as defined by the claims of their application, Ser. No. 53,022, filed July 29, 1960, and D. W. Masters, as defined by the claims of his application, Ser. No. 53,024, filed July 29, 1960, all such applications being assigned to the assignee of the present application.

Furthermore, certain portions of the apparatus herein disclosed are not of my sole invention, but are the inventions of:

W. G. Facenda Jr., R. B. Wright, Jr., and David Zeheb, as defined by the claims of their application, Ser. No. 46,161, filed July 29, 1960, G. B. Barclay de Tolly and R. B. Wright, Jr., as defined by the claims of their application, Ser. No. 46,163, filed July 29, 1960, and H. L. Herold, D. W. Masters, and R. B. Wright, Jr., as defined by the claims of their application, Ser. No. 53,023, filed July 29, 1960, all such applications being assigned to the assignee of the present application.

What is claimed is:

1. In combination, first means for handling data entities at regular intervals, wherein each group of $n$ successive data entities handled constitutes a data item, a temporary storage register having a first section of $m$ storage spaces for storing $m$ data entities and a second section of $n$ storage spaces for storing $n$ data entities, where $m$ is an integer less than $n$, said register being adapted to have the combined contents of the first and second sections thereof serially shifted, means for transferring data entities between said register and said first means at said regular intervals, a data storage unit for storing a plurality of data items, means for transferring a complete data item between said register and said data storage unit, means for providing a signal when the $n$ entities of a complete data item are stored in said second section, and means responsive to said signal for causing said $n$ entities in said second section to be serially shifted through $m$ storage spaces, whereby $m$ of the $n$ entities originally in said second section are stored in said first section.

2. In combination, first means for handling data entities at regularly occurring intervals, wherein each group of $n$ successive data entities handled constitutes a data item, a temporary storage register having a first section of $m$ storage spaces for storing $m$ data entities and a second section of $n$ storage spaces for storing $n$ data entities, where $m$ is an integer less than $n$, said register being adapted to have the combined contents of the first and second sections thereof serially shifted, means for transferring data entities between said register and said first means at said regularly occurring intervals, a data storage unit for storing a pluarlity of data items, means for transferring a complete data item between said register and said data storage unit, means for providing a signal when the $n$ entities of a complete data itms are stored in said second section, and means responsive to said signal for causing said $n$ entities in said second section to be serially shifted through $m$ storage spaces during one of said intervals, whereby $m$ of the $n$ entities originally in said second section are stored in said first section.

3. In combination, a data receiver for sequentially receiving data entitles, wherein each group of $n$ successive data entities constitutes a data item, temporary storage means having $m+n$ storage spaces for storing $m+n$ data entities, means for sequentially transferring data entities from said temporary storage means to said data receiver, a data storage unit for storing a plurality of data items, means for providing a signal when at least $n-m$ data entities of a first data item stored in said temporary storage means have been transferred to said data receiver, and means responsive to said signal for transferring a second data item from said data storage unit to said temporary storage means prior to the time when said receiver has received all data entities of said first data item.

4. In combination, a data receiver for receiving data entities at regular intervals, wherein each group of $n$ successive data entities constitutes a data item, a temporary storage register having a first section of $m$ storage spaces for storing $m$ data entities and a second section of $n$ storage spaces for storing $n$ data entities, where $m$ is an integer less than $n$, said register being adapted to have the combined contents of the first and second sections thereof serially shifted, a data storage unit for storing a plurality of data items, transfer means for transferring a data item from said data storage unit to said second section, means for transferring data entities from said first section to said receiver at said regular intervals, means for providing a first signal in the one of said intervals following the transfer of the last of the $n$ entities of a complete data item from said first section to said receiver, and means responsive to said first signal for causing said combined contents to be serially shifted through $m$ storage spaces in said interval, whereby data entities of a data item in said second section fill said first section.

5. A combination, as in claim 4, further including means for providing a second signal following the transfer of at least $n-m$ data entities of said complete data item to said receiver, and means responsive to said second signal for causing said transfer means to transfer a data item to said second section prior to the time when said receiver has accepted all data entities of said complete data item.

6. A combination, as in claim 5, further including means for causing the contents of said first section to be serially shifted through one storage space away from said second section as each data entity is transferred from said first section to said receiver during the period between the transfer of said data item to said second section and the occurrence of the following first signal, and means for causing said combined contents to be serially shifted through one storage space away from said second section as each data entity is transferred from said first section to said receiver during the period between the occurrence of said first signal and the transfer of said data item to said second section.

7. In combination, a data receiver for accepting data items at regular intervals, a data storage unit for storing a plurality of said data items, a register for storing a data item, means for transferring data items from said storage unit to said register, means for transferring data items from said register to said data receiver, means for providing a first signal denoting transfer of a data item from said data storage unit to said register, means for providing a second signal denoting transfer of a data item from said register to said data receiver, a bistable device, means responsive to said first signal for transferring said bistable device to one state thereof, means responsive to said second signal for transferring said bistable device to the other state thereof, and means enabled by said one state and responsive to said first signal for delivering an alarm signal denoting an attempt to transfer a data item to said register before the previous data item therein has been transferred to said data receiver.

8. In combination with a data storage medium, reading means responsive to a first signal for sensing a sector of said medium and for delivering output signals representing the data stored in said sector, means for generating a first signal when said reading means is to sense said sector, means for applying said first signal to said reading means, a bistable element, first trigger means responsive to said first signal for transferring said bistable element to one state thereof, second trigger means responsive to a predetermined type of signal for transferring said bistable element to the other state thereof, means for applying said output signals to said second trigger means, means for providing a second signal when said reading means has completed sensing said sector, and means responsive to said second signal and said one state of the bistable element for providing a third signal.

9. In combination, a data receiver for accepting data items, a data transmitter for supplying data items, a register for storing a data item, means for transferring data items from said data transmitter to said register, means for transferring data items from said register to said data receiver, means for providing a first signal denoting transfer of a data item from said data transmitter to said register, means for providing a second signal denoting transfer of a data item from said register to said data receiver, a bistable device, means responsive to said first signal for transferring said bistable device to one state thereof, means responsive to said second signal for transferring said bistable device to the other state thereof, and means enabled by said one state and responsive to said first signal for delivering an alarm signal denoting an attempt to transfer a data item to said register before the previous data item therein has been transferred to said data receiver.

10. In combination, a data receiver for accepting data items; a data storage unit for storing a plurality of said data items; a register for storing a data item; first transfer means, when enabled, for transferring a data item from said storage unit to said register; second transfer means, when enabled, for transferring a data item from said register to said data receiver; means for generating a first signal to initiate transfer of a data item from said data storage unit to said register; means for coupling said first signal to enable said first transfer means; means for generating a second signal to initiate transfer of a data item from said register to said data receiver; means for coupling said second signal to enable said second transfer means; a bistable device; means responsive to said first signal for transferring said bistable device to one state thereof; means responsive to said second signal for transferring said bistable device to the other state thereof; and means enabled by said one state and responsive to said first signal for delivering an alarm signal denoting an attempt to transfer a data item to said register before the previous data item therein has been transferred to said data receiver.

11. In combination, a data receiver for accepting data items; a data storage unit for storing a plurality of said data items; a register for storing a data item; first transfer means, when enabled, for transferring a data item from said storage unit to said register; second transfer means, when enabled, for transferring a data item from said register to said data receiver; means for generating a first signal to initiate transfer of a data item from said data storage unit to said register; means for coupling said first signal to enable said first transfer means; means for generating a second signal to initiate transfer of a data item from said register to said data receiver; means for coupling said second signal to enable said second transfer means; a bistable device; means responsive to said first signal for transferring said bistable device to one state thereof; means responsive to said second signal for transferring said bistable device to the other state thereof; means enabled by said one state and responsive to said first signal for delivering a first alarm signal denoting an attempt to transfer a data item to said register before the previous data item therein has been transferred to said data receiver; and means responsive to said second signal for delivering a second alarm signal if a data item has not been transferred from said storage unit to said register subsequent to the generation of the immediate preceding one of said second signals.

12. In combination, a data receiver for accepting data items; a data transmitter for supplying said data items; a register for storing a data item; first transfer means, when enabled, for transferring a data item from said data transmitter to said register; second transfer means, when enabled, for transferring a data item from said register to said data receiver; means for generating a first signal to initiate transfer of a data item from said data transmitter to said register; means for coupling said first signal to enable said first transfer means; means for generating a second signal to initiate transfer of a data item from said register to said data receiver; means for coupling said second signal to enable said second transfer means; a bistable device; means responsive to said first signal for transferring said bistable device to one state thereof; means responsive to said second signal for transferring said bistable device to the other state thereof; and means enabled by said one state and responsive to said first signal for delivering an alarm signal denoting an attempt to transfer a data item to said register before the previous data item therein has been transferred to said data receiver.

13. In combination with a data storage medium, reading means responsive to a first signal for sensing a sector of said medium and for delivering output signals representing the data stored in said sector, a bistable element, first trigger means responsive to said first signal for transferring said bistable element to one state thereof, second trigger means responsive to a predetermined type of signal for transferring said bistable element to the other state thereof, and means for applying said output signals to said second trigger means.

14. The combination of claim 13, further including means for providing a second signal when said reading means has completed sensing said sector, and means responsive to said second signal and said one state of the bistable element for providing a third signal.

15. For employment with a longitudinal data storage means, wherein data is stored in binary digital form in transverse locations thereof, said locations being disposed in groups, each of said groups being preceded by a group beginning marker and followed by a group terminating marker; wherein reading means is disposed opposite said medium for sensing data and markers on said medium when relative motion is provided between said reading means and said medium, said reading means delivering signals representing the binary digits of data sensed thereby and signals representing said beginning and terminating markers; and wherein means provides relative motion between said medium and said reading means; apparatus for detecting the failure to read data from one of said groups comprising: means for generating a first signal when the contents of a group is to be read, gating means rendered operable by one of said signals representing a beginning marker for transmitting said signals representing the binary digits of data sensed by said reading means, a flip-flop, first trigger means responsive to said first signal for transferring said flip-flop to one state thereof, second trigger means for receiving the signals transmitted by said gating means and responsive to a predetermined type of binary digit for transferring said flip-flop to the other state thereof, and an alarm means rendered operable by the conjoint occurrence of one of said signals representing a terminating marker and said one state of said flip-flop for providing an alarm signal.

16. The combination of a data storage medium for storing data in the form of groups of binary digits, sensing means responsive to a first signal for sensing all of the stored binary rigits of one of said groups and for delivering output signals representing said binary digits, means for generating a first signal when one of said groups is to be sensed, means for applying said first signal to said sensing means, a bistable element, first trigger means responsive to said first signal for transferring said bistable element to one state thereof, second trigger means responsive to a predetermined type of binary digit for transferring said bistable element to the other state thereof, means for applying said output signals to said second trigger means, means for providing a second signal when said sensing means has completed sensing said one group, and means responsive to the conjoint concurrence of said second signal and to said one state of the bistable element for providing a third signal.

(References on following page)

References Cited

UNITED STATES PATENTS

| | | | |
|---|---|---|---|
| 2,872,666 | 2/1959 | Greenhalgh | 340—172.5 |
| 2,916,210 | 12/1959 | Selmer | 340—172.5 |
| 2,926,338 | 2/1960 | Bensky | 340—174.1 |
| 2,936,444 | 5/1960 | Heiken | 340—174.1 |
| 2,969,522 | 1/1961 | Crosby | 340—172.5 |
| 3,061,192 | 10/1962 | Terzian | 340—172.5 |

ROBERT C. BAILEY, Primary Examiner

R. RICKERT, Assistant Examiner